UNITED STATES PATENT OFFICE.

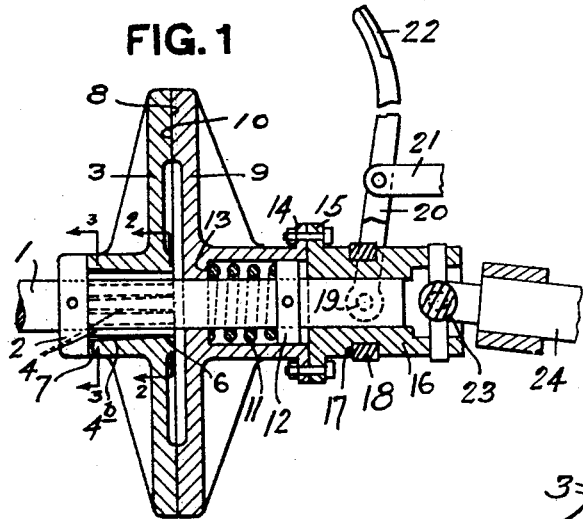
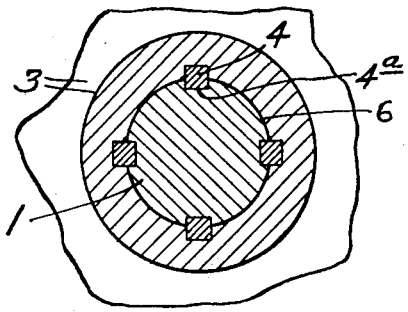
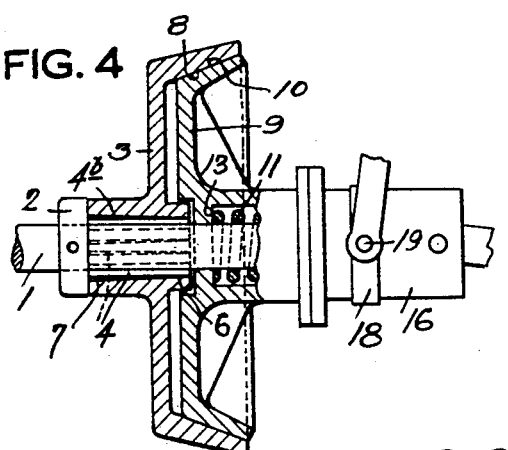
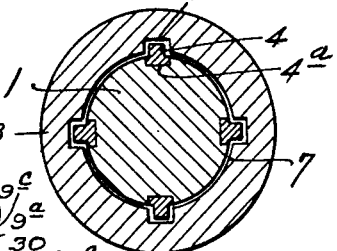
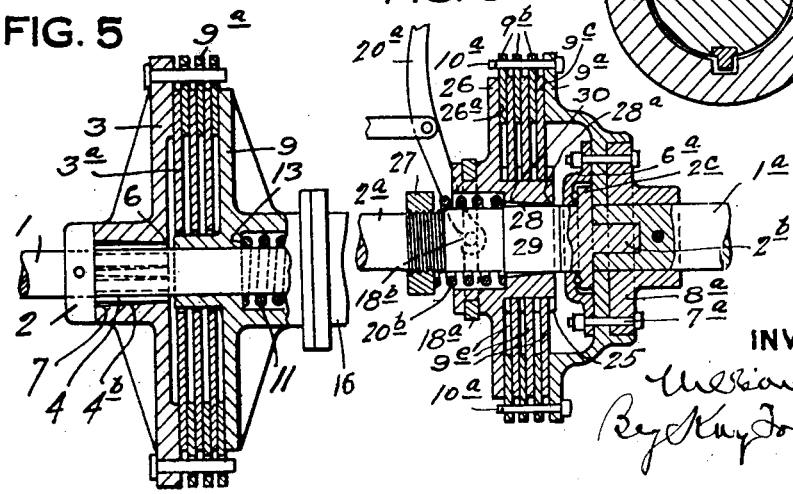

WILLIAM G. PRICE, OF YAKIMA, WASHINGTON.

FRICTION-CLUTCH.

1,397,902.     Specification of Letters Patent.     Patented Nov. 22, 1921.

Application filed April 4, 1918. Serial No. 226,560.

*To all whom it may concern:*

Be it known that I, WILLIAM G. PRICE, a citizen of the United States, and resident of Yakima, in the county of Yakima and State of Washington, have invented a new and useful Improvement in Friction-Clutches; and I do hereby declare the following to be a full, clear, and exact description thereof.

My invention relates to friction-clutches either of the cone or disk type connected to the driving and driven-shafts to transmit power from one shaft to the other.

The object of my invention is to provide a friction-clutch of the above type which shall eliminate the sudden gripping or grabbing which ordinarily take place in a clutch of this type and which overstrains the shafts and transmission gears as used in automobiles.

To these ends my invention comprises, generally stated, a driving-shaft, a driven shaft, and a clutch of either the friction-bearing cone or the disk friction-bearing types, means for bringing said bearings into pressure contact, and means for permitting one of said disks to rock on its bearing on the said shaft whereby the speed of the driven-shaft is slowly or quickly raised to that of the driven-shaft practically without shock.

In the accompanying drawings, Figure 1 is a longitudinal section of my improved clutch as applied to the double-disk type; Fig. 2 is a section on the line 2—2, Fig. 1; Fig. 3 is a section on the line 3—3, Fig. 1; Fig. 4 is a longitudinal section of my invention as applied to a cone-clutch; Fig. 5 is a longitudinal section of the same as applied to a multiple disk clutch, and Fig. 6 shows a modified form of my invention.

In the drawing, the numeral 1 designates a driving-shaft driven by any suitable motor or engine and fixed to such shaft is the collar 2. The disk 3 is fastened to the shaft 1 and is held against rotation on said shaft by the keys 4, said disk being held from movement on said shaft in one direction by the collar 2.

The disk 3 has a conical bore which fits neatly at its inner end 6 around the shaft 1, but at its outer end 7 is flared so as to permit the said disk to rock on said shaft, for the purpose more fully hereinafter set forth.

The keys 4 are T-shaped and their heads fit snugly within seats $4^a$ formed in the shaft 1, while their outer portions engage seats $4^b$, but said outer portions form a tight-fit in the seats $4^b$ only at their ends at 6 and taper in width and height from that point outwardly so that, as shown in Fig. 1 at the point 7, there is sufficient play in the seats $4^b$ to allow the disk 3 to rock on the shaft and still hold said disk from rotation on said shaft.

The disk 3 is provided with the bearing-surface 8 at its outer circumference.

The disk 9 is fitted closely to the shaft 1 but is free to slide and revolve on said shaft, and said disk has the bearing-surface 10 which registers with and is adapted to press against the bearing-surface 8 of the disk 3 when the clutch is in operation.

The spring 11 which surrounds the shaft 1 abuts on the collar 12 which is fixed to the shaft 1 and presses against the annular shoulder 13 on said disk 9 to bring the bearing-surfaces 8 and 10 into frictional contact.

The disk 9 has the lugs 14 which are bolted to the lugs 15 of the sliding collar 16. The collar 16 is provided with a groove 17 and in said groove is the ring 18 provided with the lugs 19 which are engaged by the forked-lever 20. The lever 20 is fastened to the fulcrum piece 21 which is fixed to the frame of the automobile. The lever 20 is provided with the foot bearing-surface 22.

Pressure applied to the lever at 22 relieves the clutch bearing-surfaces 8 and 10 from frictional pressure. The sliding collar 16 carries the universal joint 23 which is connected to and drives the shaft 24.

In practice I have found that when the disk 3 is rigidly fixed to the shaft 1 and the disk 9 is a close bearing sliding fit on the shaft 1, the clutch may take hold with great force when only a light pressure is applied, which strains the shaft excessively and moves the automobile with a jerky motion. This is due to slight imperfections in manufacture or to wear of parts.

By my construction with one or other of the bearings of the disks 3 or 9, so that they can rock on the shaft 1, the clutch will take hold smoothly and not strain the shaft or jerk the automobile and slight imperfections in manufacture and much wearing of parts will not cause the clutch to grab suddenly.

For the entire success of my improved clutch, it is necessary that the bearing of the disk 3 be a close fit on the shaft at the end of the bearing at 6 and that this close fit at 6 be approximately in the plane of the disk surface 8. If the disks 3 and 9 were provided with absolutely perfect cylindrical close-fitted bearings on the shaft 1 and with the plane of the disk surfaces absolutely normal to the shaft, such a clutch would operate smoothly, as long as the faces of the disks remain parallel and true, but if the friction faces of the disks should become irregular through wear or other causes, the disks will tend to spring and be moved eccentric to their normal plane when brought into frictional engagement, thus causing the clutch to "grab" and jerk the automobile.

In Fig. 4 I have shown my invention as applied to an ordinary cone clutch.

In Fig. 5 I have illustrated my improved clutch in connection with a multiple disk clutch in which a number of thin disks are interposed alternately between the disks 3ª and 9ª, one-half of these interposed disks being connected to the disk 3, the other half connected to the disk 9 in the usual manner of constructing disk clutches.

Fig. 6 is a section through a multiple disk clutch in which 1ª is the driving-shaft and 2ª is the driven-shaft. The shaft 2ª has a journal 2ᵇ which bears in the end portion of the shaft 1ª. The shaft 2ª has a flange 2ᶜ which engages a ball bearing which rests against the plate 6ª and holds the shaft 2ª against end movement. The plate 6ª is secured by the bolts 7ª to the collar 8ª which is keyed rigidly to the shaft 1ª. The annular piece 9ª is also secured to the collar 8ª by the bolts 7ª and carries the bolts 10ª which support the disks 9ᵇ. The piece 9ª has the disk bearing surface 9ᶜ. The disks 9ᵉ are interposed between the disks 9ᵇ and are supported by the lugs 25 which are a part of the annular piece 26. The piece 26 has the disk surface 26ª. The piece 26 carries the clutch-ring 18ª and lugs 18ᵇ which are engaged by the lever 20ª to release the clutch. The spring 20ᵇ rests against the nut 27 and against the piece 26 and acts to force all of the disk friction surfaces into contact.

The piece 26 has a square tapered bearing 28. The shaft 2ª has the square portion 29 which engages the bearing 28. The bearing 28 slides on the square portion of the shaft 29. The tapered bearing 28 fits the shaft closely at the end 28ª and is separated from the shaft at the end of the bearing 30.

By my invention, therefore, I obtain a friction clutch in which the sudden gripping or grabbing of the clutch is eliminated as well as the strains on the shafts and transmission gears, so that in automobiles the sudden jolts and jerks due to drawing in and out of the clutches is avoided.

What I claim is:

1. In a friction clutch, a driving-shaft, a driven-shaft, driving and driven disks secured to said shafts, respectively, said disks having annular friction faces, means for bringing said disks into frictional face contact with each other, and means for permitting one of said disks to oscillate on its bearing about any line radial of its axis to adjust itself angularly with respect to its normal axis.

2. In a friction clutch, a driving-shaft, a driven-shaft, driving and driven disks secured to said shafts, respectively, said disks having annular friction faces, means for bringing said disks into frictional face contact with each other, and means for permitting one of said disks to freely oscillate on its shaft about any line radial of its axis so as to automatically adjust itself angularly with respect to its normal axis, the axis of said oscillation being approximately in the plane of its friction face.

3. In a friction clutch, a driving-shaft, a driven-shaft, driving and driven disks carried by said shafts respectively, said disks having annular friction faces, one of said disks having a bearing on its shaft fitting closely to said shaft in the plane of its friction face, and fitted loosely at the other end of its bearing whereby it is capable of oscillating on its shaft about any line radial of its axis.

4. In a friction clutch, a driving-shaft, a driven-shaft, driving and driven disks secured to said shafts, respectively, and means for bringing said disks into face contact with each other, one of said disks having a conical bore whereby said disk is free to oscillate on its shaft about any line radial of its axis.

5. In a friction clutch, a driving-shaft, a driven-shaft, a driving disk and a driven disk secured to said shafts, respectively, said disks having annular friction faces, one of said disks having a conical bore, the smaller end of said bore fitting closely to the shaft of the said disk adjacent to the friction face of the other disk, whereby the disk having the said conical bore is free to oscillate on its shaft.

6. In a friction clutch, a driving-shaft, a driven-shaft, a driving disk and a driven disk secured to said shafts respectively, one of said disks having a conical bore, a key engaging seats formed in said driving shaft, and said key having a tapered portion engaging a seat formed in said conical bore, the end of said key at the smaller end of said conical bore forming a tight fit therein.

7. In a friction clutch, a driving shaft, a driven shaft, a driving disk and a driven disk secured to said shafts respectively, one of said disks having a conical bore and a key engaging seats formed in one of said shafts adjacent to the said conical bore, said key having a tapered portion engaging a seat formed in said conical bore, the end of said key at the smaller end of said conical bore forming a tight fit therein.

In testimony whereof I the said WILLIAM G. PRICE have hereunto set my hand.

WILLIAM G. PRICE.

Witnesses:
O. N. WALTZ,
ARTHUR W. COFFIN.